Sept. 23, 1952     T. N. HANNANT     2,611,581
VARIABLE ANGLE CORNER PULLEY
Filed April 17, 1946
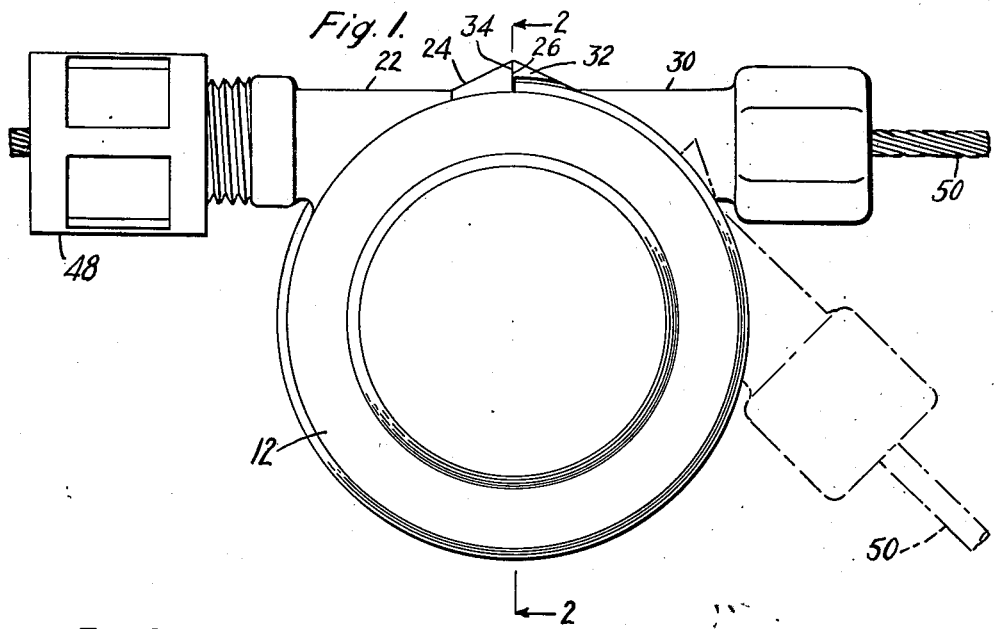
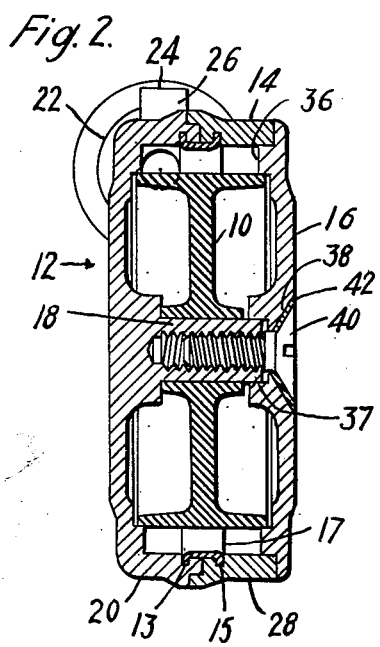
INVENTOR.
THEODORE N. HANNANT
BY
J. William Carson
ATTORNEY Patented Sept. 23, 1952

2,611,581

UNITED STATES PATENT OFFICE 2,611,581

VARIABLE ANGLE CORNER PULLEY

Theodore N. Hannant, Cedar Grove, N. J., assignor to Specialties Development Corporation, Bloomfield, N. J., a corporation of New Jersey Application April 17, 1946, Serial No. 662,849

9 Claims. (Cl. 254—190)

This invention relates to improvements in pulley assemblies, and is particularly directed to pulley assemblies of the type having housings and cable guides.

Pulley assemblies of the character indicated, as at present in use, have certain disadvantages. One of these disadvantages resides in the difficulty in threading the cable on the pulley and another is the fact that the cable guides are in fixed positions so that for different installations or uses different pulley structures are required.

Accordingly, an object of the present invention resides in the provision of a pulley assembly wherein the cable for use therewith can readily be applied thereto.

Another object of the invention resides in the provision of a pulley assembly wherein the cable can be applied thereto without dismantling the assembly.

Another object resides in the provision of an assembly adapted for use in many types of installations.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 1 is an elevational view of a pulley assembly embodying the present invention.

Figure 2 is a sectional view on line 2—2 of Figure 1.

Figure 3 is an end view.

Referring to the drawing in detail, the assembly comprises a pulley member 10, a circular cup shaped housing member 12 and a cylindrical housing member 14 enclosing the pulley, and a cover plate 16 closing the open end of the housing 14. Each of the housing members 12 and 14 has an annular groove 13 and 15, respectively, in its inner wall for the reception of the flanges of a split metal ring 17 for securing the members in a manner to be rotated relatively to each other.

The member 12 has a central boss 18 serving as an axle for the hub of the pulley 10 which is freely rotatable thereon. The member 12 also has a peripheral flange or skirt 20 and a tangentially extending guide tube 22 integral therewith. The peripheral flange 20 is also provided with a stop member 24 having a flat engaging face 26 extending radially of the housing member 12 and located substantially at the junction of the guide tube 22 with the flange 20.

The housing member 14 comprises a ring portion 28 which is provided with an integral guide tube 30 extending tangentially thereto and with a stop member 32 having a flat engaging face 34 projecting radially and laterally of the ring into alignment with and adapted to engage the flat engaging face 26 of the stop member 24 as will be described hereinafter.

The cover plate 16 is provided to close the side of the assembly. This plate, as will be seen from Figure 2, is larger in diameter than the pulley, so that when the plate is removed the entire pulley is exposed. The inner side of the plate is provided with an annular shoulder 36 extending into the ring 28 between the inner periphery of the ring and the outer periphery of the pulley, and is also provided with a bore portion 37 for receiving the boss 18. The outer side of the plate is provided with a countersunk aperture 38 for receiving a screw 40 which is threaded in the boss 18 whereby to secure the cover plate in place. A lock washer 42 is provided between the head of the screw and the countersunk aperture.

When it is desired to apply a cable 50 to the pulley, the cover plate 16 is removed by removing the screw 40 whereby the cable may readily be wrapped around the pulley, and its respective ends may be threaded through the cable guide tubes 22 and 30. When the cover plate is removed the members 12 and 14 remain in place, they being held together by the split ring 17.

The housing members 12 and 14 are rotatable relatively to each other so that the guide tubes 22 and 30 may be positioned at different relative angles depending on the installation in which the assembly is to be used. The cable guide tubes may be positioned in alignment with each other, as shown in full lines in Figure 1, with the flat faces of the stops 24 and 32 in engagement, or they may be positioned at any angle, one of such positions being shown in broken lines.

When it is desired to adjust the guide tubes the screw 40 is loosened, the members 12 and 14 carrying the tubes are moved to their desired relative positions, and the screw is tightened to secure the members 12 and 14 with the tubes in their adjusted positions.

In some installations, cable conduits are secured to one or both of the pulley guide members, and in many installations the cable conduits or pipe lines are installed prior to the installation of the pulleys and cables, whereby it becomes necessary to thread the cable through the pulley as it passes out of the conduit or pipe line. Under such conditions considerable difficulty has heretofore been experienced in threading the cable through the pulley.

With the pulley assembly of the present invention, the cable can be threaded through the pulley with comparative ease, even when the pulley assembly is installed with conduits and pipe lines attached thereto, by merely removing the cover plate whereby to expose the entire pulley.

In the device of the present invention, the end of one of the guide tubes is externally screw threaded to receive a coupling 48 for the attachment of a conduit when desired. It is to be understood that both of the guide tubes may be provided with couplings if so desired for the attachment of conduits to both tubes.

It will be seen from the foregoing that the present invention provides a pulley assembly wherein the cable for use therewith can readily be applied thereto, without dismantling the assembly, and wherein the guides for the cable can be positioned at any angle relatively to each other, whereby to accommodate the assembly for use in a great variety of installations.

It will also be seen that in applying the cable to the pulley it is not necessary to dismantle the assembly, as is necessary with pulley assemblies at present in use. In the assembly of the present invention the removal of the cover plate is all that is required to expose the pulley and when the plate is removed the cable may be readily applied.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a pulley assembly, the combination of a cup-shaped member and a cylindrical member comprising a pair of housing members, a pulley having a flat peripheral surface providing an annular rim extending parallel to the axis of rotation of the pulley, said pulley being enclosed by said members, one of said members having an integral central boss providing an axle on which said pulley is freely rotatable, and a cover plate removably secured to said boss and comprising the sole means for covering one side of said pulley, whereby when the cover plate is removed the rim and said side of the pulley will be exposed.

2. In a pulley assembly, the combination of a pair of housing members each having an annular groove formed therein, a flanged ring having its flanges disposed in said grooves whereby to connect said members rotatably relatively to each other, a cable guide on each of said members, a pulley enclosed in said members, and a cover plate removably secured to one of said members, whereby to expose the pulley to facilitate threading a cable through said guides and about the pulley.

3. In a pulley assembly, the combination of a pair of cylindrical housing members, complementary interengaging means on adjacent peripheral edges of said members permitting relative rotation thereof, a pulley completely enclosed by said members, a cover plate of a larger diameter than the pulley removably secured to one of said members whereby to expose the rim and cover plate side of the pulley when the cover is removed, and common means for securing said plate removably and said housing members against rotation.

4. A pulley assembly comprising in combination, a pulley, a pair of relatively rotatable housing sections enclosing said pulley, a boss integral with one of said sections for rotatably mounting said pulley, guide tubes on said sections and being rotatable with the housing sections to different angular positions relatively to each other, stop members on said housing sections for aligning said tubes in a given position, and a cover plate removably secured to said boss and comprising the sole means for covering one side of said pulley, whereby when the plate is removed the rim and the said side of the pulley will be exposed to facilitate threading of a cable through said guide tubes and about said pulley.

5. In a pulley assembly, the combination of a pair of housing members each having an annular groove formed therein, a flanged split metal ring having its flanges disposed in said grooves, whereby to connect said members rotatably relative to each other, a pulley enclosed in said members, and a cover plate removably secured to one of said members.

6. A pulley assembly comprising in combination, a pair of relatively rotatable cylindrical housing sections, one of said sections having an open end; a pulley having a flat peripheral rim spaced from the inner cylindrical walls of the sections for the accommodating a cable; means carried by one of said sections for rotatably mounting the pulley within said sections; a cover plate for said open end covering the side of the pulley adjacent said open end; means for removably mounting said cover plate on said open ended housing section, whereby the removal of the cover will expose the peripheral rim, the space between the periphery of the pulley and the walls of the sections, and the cover side of the pulley; and a cable outlet in each of said housing sections communicating with said space and being rotatable therewith to different angular positions relative to each other, and means for securing said sections in said different angular positions relative to each other.

7. A pulley assembly comprising in combination; a pair of relatively rotatable cylindrical housing sections each having a tangentially extending opening; a pulley having a flat peripheral rim of a diameter to provide a space between said rim and the inner cylindrical walls of the sections; one of said sections having an open end and means carried by the other of said sections for rotatably mounting the pulley within said sections; a cover plate for said open end of the housing section covering one side of the pulley; said cover plate having an annular shoulder of a diameter larger than the diameter of the pulley extending partially into the space between the rim of the pulley and the inner cylindrical walls of the housing sections; means for removably mounting said cover plate on one of said housing sections, whereby the removal of the cover will expose the peripheral rim, the space, and one side of the pulley.

8. A pulley assembly comprising in combination; a pair of relatively rotatable cylindrical housing sections; a pulley, the periphery of which is spaced from the inner cylindrical walls of the sections and provides a laterally extending peripheral rim, one of said sections having an open end; means carried by one of said sections for rotatably mounting the pulley within said sections; a cover plate for said open end completely covering the side of the pulley adjacent said open end; said cover plate having an annular shoulder of a diameter larger than the pulley extending partially into the space between the periphery of the pulley and the innner cylindrical walls of the housing sections; means for removably mounting said cover plate on said open ended housing section, whereby upon removal thereof the peripheral rim, the said space and the cover side of the pulley will be exposed; a cable guide carried by each of said housing sections and being rotatable therewith to different angular positions relative to each other; a stop member carried by each of said sections extending into the path of each other whereby to align the cable guides in a predetermined position of the housing sections, and means for securing said housing sections in said different angular positions.

9. A pulley assembly comprising in combination, a pulley, a pair of relatively rotatable housing sections enclosing said pulley, a shaft projecting from one of said sections for rotatably mounting said pulley, a guide tube carried by each of said housing sections and rotatable therewith, stop members on said housing sections, each of said stop members extending into the path of the other for engagement therewith, whereby to align said tubes in a predetermined position of the housing sections, and a cover plate removably secured to said shaft and comprising the sole means for covering one side of said pulley, whereby when the plate is removed the rim of the pulley will be exposed to facilitate threading of a cable through said guide tubes and about said pulley.

THEODORE N. HANNANT.

REFERENCES CITED

The following references are of record in the file of this patent:

UNITED STATES PATENTS

| Number | Name | Date |
|---|---|---|
| 811,191 | Whiteside | June 30, 1906 |
| 1,627,076 | Caracristi | May 3, 1927 |
| 1,753,084 | Kappel | Apr. 1, 1930 |